(12) United States Patent
Sotzny et al.

(10) Patent No.: US 10,493,635 B2
(45) Date of Patent: Dec. 3, 2019

(54) ROBOT ASSEMBLY AND CORRESPONDING ASSEMBLY METHOD

(71) Applicant: DÜRR SYSTEMS AG, Bietigheim-Bissingen (DE)

(72) Inventors: Steffen Sotzny, Oberstenfeld (DE); Alexander Schulz, Marbach (DE); Mario Heunsch, Freiberg am Neckar (DE)

(73) Assignee: DÜRR SYSTEMS GMBH, Bietigheim-Bissingen (DE)

( * ) Notice: Subject to any disclaimer, the term of this patent is extended or adjusted under 35 U.S.C. 154(b) by 514 days.

(21) Appl. No.: 15/126,735

(22) PCT Filed: Mar. 6, 2015

(86) PCT No.: PCT/EP2015/000504
§ 371 (c)(1),
(2) Date: Sep. 16, 2016

(87) PCT Pub. No.: WO2015/139820
PCT Pub. Date: Sep. 24, 2015

(65) Prior Publication Data
US 2017/0217024 A1 Aug. 3, 2017

(30) Foreign Application Priority Data
Mar. 18, 2014 (DE) .......................... 10 2014 003 931

(51) Int. Cl.
*B25J 15/04* (2006.01)
*B05B 13/04* (2006.01)
*B25J 17/02* (2006.01)

(52) U.S. Cl.
CPC ............ *B25J 15/04* (2013.01); *B05B 13/0431* (2013.01); *B25J 17/02* (2013.01); *Y10S 901/29* (2013.01); *Y10S 901/43* (2013.01)

(58) Field of Classification Search
CPC ............................. B25J 15/04; B05B 13/0431
See application file for complete search history.

(56) References Cited

U.S. PATENT DOCUMENTS 4,549,846 A * 10/1985 Torii ....................... B25J 15/04
24/603
4,875,275 A * 10/1989 Hutchinson ........... B23B 31/113
279/93

(Continued)

FOREIGN PATENT DOCUMENTS

| CN | 1246087 A | 3/2000 |
|----|-----------|--------|
| CN | 201949970 U | 8/2011 |

(Continued)

OTHER PUBLICATIONS

International Search Report and Written Opinion for PCT/EP2015/000504 dated Aug. 10, 2015 (with English translation; 15 pages).

(Continued)

*Primary Examiner* — Terence Boes
(74) *Attorney, Agent, or Firm* — Bejin Bieneman PLC (57) ABSTRACT

A robot assembly having an exchangeable application device is provided. The application device is connected and exchangeable via an intermediate flange, with the respective construction lengths of the application device and the intermediate flange being matched to each other as a pair such that an exchange of the application device together with the associated and individually matched intermediate flange maintains the tool center point.

13 Claims, 5 Drawing Sheets

(56) References Cited

U.S. PATENT DOCUMENTS

| | | | |
|---|---|---|---|
| 4,899,936 A * | 2/1990 | Weinstein | B05B 3/1064 |
| | | | 239/224 |
| 4,919,333 A | 4/1990 | Weinstein | |
| 5,341,458 A * | 8/1994 | Kaneko | G05B 19/425 |
| | | | 318/568.13 |
| 6,317,699 B1 | 11/2001 | Watanabe et al. | |
| 9,370,792 B2 | 6/2016 | Wesselky et al. | |
| 2006/0104792 A1 * | 5/2006 | Giuliano | B05B 13/0431 |
| | | | 414/744.3 |
| 2011/0049110 A1 | 3/2011 | Lochner et al. | |
| 2011/0221100 A1 * | 9/2011 | Wesselky | B05B 3/1092 |
| | | | 264/401 |

FOREIGN PATENT DOCUMENTS

| | | | |
|---|---|---|---|
| CN | 103492133 | A | 1/2014 |
| DE | 9001451 | U1 | 6/1991 |
| DE | 3780874 | T2 | 2/1993 |
| DE | 19914040 | A1 | 10/2000 |
| EP | 1285733 | A2 | 2/2003 |
| EP | 2777822 | A1 | 9/2014 |
| EP | 2699392 | B1 | 10/2015 |
| JP | S60-213493 | A | 10/1985 |
| JP | S62-264886 | A | 11/1987 |
| JP | 2011054568 | A | 3/2011 |
| WO | 2004007089 | A1 | 1/2004 |
| WO | 2007027147 | A1 | 3/2007 |
| WO | 2010028864 | A2 | 3/2010 |

OTHER PUBLICATIONS

Search Report from Chinese Office Action for CN 201580013996.2 (2 pages; English translation).

Notification of Reasons for Rejection from the Japan Patent Office for JP Patent Application No. 2016-557298 dated Mar. 12, 2019 (7 pages; with English translation).

* cited by examiner

ROBOT ASSEMBLY AND CORRESPONDING ASSEMBLY METHOD

CROSS-REFERENCE TO RELATED APPLICATIONS

This application is a national stage of, and claims priority to, Patent Cooperation Treaty Application No. PCT/EP2015/000504, filed on Mar. 6, 2015, which claims priority to German Application No. DE 10 2014 003 931.5 filed on Mar. 18, 2014, each of which applications are hereby incorporated herein by reference in their entireties.

BACKGROUND

This disclosure relates to a robot assembly, particularly with a painting robot, and a corresponding assembly method for such a robot assembly.

In modern coating plants for painting vehicle body components, multi-axis painting robots with serial kinematics are usually used in order to guide rotary atomizers with maximum freedom of movement. In this arrangement, the rotary atomizer is generally located on an assembly flange on a robot wrist axis of the painting robot, the rotary atomizer being provided, via the assembly flange, with the required media. Exemplary media include, for example, drive air to drive a compressed air turbine, shaping air for shaping the spray jet, high voltage for electrostatic coating charge, bearing air for air bearings in the rotary atomizer, solvent lines and return lines.

In such coating plants, it is necessary, for example in test phases, to sequentially test different types of application devices (e.g. rotary atomizers, air atomizers, etc.), which requires the assembled application devices to be replaced.

A known method for replacing the application devices exists in that the individual supply lines for the application device are released at the next separating point behind the assembly flange in order to enable another application device to be assembled. However, this method for replacing an application device is extremely time-intensive as the supply lines have to be individually separated and reconnected to each other. In addition, the separating points for the individual supply lines cannot normally be placed immediately behind the wrist axis, as a rotation angle of approximately ±540° has to be compensated for. Thus, the separating point of the supply lines is usually disposed relatively far upstream in the robot arm, which makes it difficult to separate and reconnect the individual supply lines. This known method for replacing an application device on a painting robot is therefore extremely complicated and may require up to two hours to change over to another atomizer type.

Another known method for replacing an application device on a painting robot is described below with reference to FIGS. 8A-8D. The figures show an electrostatic atomizer 1 with a rotary bell 2 and an external charge ring 3 for electrostatically charging the coating agent, which is known per se in the prior art. The atomizer 1 is assembled via an intermediate flange 4 on a robot wrist axis 5, said robot wrist axis 5 being part of a conventional multi-axis painting robot with serial kinematics, so that a detailed description of the painting robot can be dispensed with at this point. The intermediate flange 4 has a flange face 6 on the robot-side, which is linked to a corresponding robot flange 7 on the robot wrist axis 5. In addition, the intermediate flange 4 has an atomizer-side flange face 8, which is connected to a corresponding atomizer flange 9 of the rotary atomizer 1. In this arrangement, the rotor flange 7 on the robot wrist axis 5 provides not only the supply lines (e.g. for drive air, shaping air, high voltage, paint, solvent, return, etc.) for the currently assembled type of rotary atomizer 1. The robot flange 7 also has a connection configuration with a multiplicity of connections for all possible types of application devices on the robot wrist axis 5. In this arrangement, the intermediate flange 4 is individually matched to the corresponding type of rotary atomizer 1 and selects from those connections that are provided on the robot flange 7 the connections that are required by the corresponding type of rotary atomizer 1. The connections required by the corresponding type of rotary atomizer 1 are then provided in the required connection configuration on the atomizer-side flange face 8 of the intermediate flange 4 so that the atomizer 1 can be assembled on the intermediate flange 4. The intermediate flange 4 is thus an adapter, which matches the required connection configuration to the corresponding type of rotary atomizer 1.

In this arrangement, the intermediate flange 4 has a specific construction length LF, which, with a corresponding construction length LZ of the rotary atomizer 1, adds up to an overall construction length LG between the robot flange 7 and a tool centercenter point TCP. In this arrangement, the painting robot is actuated by a central robot control, the overall construction length LG between the robot flange 7 and the tool centercenter point TCP being stored in the robot control. The problem here is that replacing the rotary atomizer 1 together with the individually matched intermediate flange 4 normally leads to a change in the actual construction length LG between the robot flange 7 and the tool center point TCP. Firstly, this is due to the fact that the newly replaced atomizer 1 can usually have a different construction length LZ. Secondly, however, the change in the overall construction length LG when replacing the rotary atomizer 1 is also due to the fact that the intermediate flange 4 can have a different construction length LF. After replacing the rotary atomizer 1 with the intermediate flange 4, however, the changed construction length LG results in the construction length LG stored in the robot control no longer matching the actual construction length LG so that the tool center point TCP is actuated along an incorrect track. This in turn means that the coating results obtained in this way are practically incomparable.

A replacement flange is known from DE 90 01 451 U1, which enables a real application device to be replaced by a simulation tool. In this arrangement, the replacement flange accomplishes a geometric adjustment so that, in its spatial arrangement in the robot, the simulation tool matches the real application device. However, this concept has so far not been suited to replacing real application devices as such a replacement flange requires a multiplicity of line ducts, which cannot be accommodated in the available space.

Furthermore, WO 2010/028864 A2, EP 1 285 733 A2 and DE 37 80 874 T2 are also prior art.

Therefore, it would be desirable to replace the application device on an application robot simply and quickly, where the coating results obtained with different types of application devices may also be comparable with each other.

SUMMARY

This disclosure includes matching together in pairs the intermediate flange on the one hand and the corresponding application device on the other hand, with respect to both the connection configuration required in each case and also the construction length. For example, if an application device is to be assembled with a relatively short construction length, an intermediate flange with a correspondingly long construction length is provided to compensate for the shorter construction length of the application device. If, on the other hand, an application device is to be assembled with a relatively long construction length, then this application device is combined with an intermediate flange with a correspondingly short construction length. This matching of the application device and the intermediate flange based on respective construction lengths is undertaken so that the overall construction length of a pair consisting of application device and intermediate flange is constant and matches the construction length which is stored in the robot control and which is used to actuate the tool center point TCP. This offers the advantage that the tool center point TCP is always actuated along the programmed track irrespective of the type of application device assembled in each case. So, in contrast to the prior art described at the beginning, a changeover to another type of application device does not lead to the tool center point deviating from the programmed trajectory.

Usually, the tool center point of an application device (e.g. rotary atomizer) has a lateral offset in relation to the central axis of the robot flange, said offset being able to fluctuate depending on the type. However, it is desirable that a changeover of the application device leaves the tool center point unaffected not only in the longitudinal direction but also in the lateral direction. Thus, in some implementations of this disclosure, the lateral offset is matched by the intermediate flange matched pair-wise to the application device so that the actual overall width between the central axis of the robot flange and the tool center point matches the overall width stored in the robot control. In this arrangement, therefore, a changeover of the application device does not result in a shift in the actual tool center point, neither in the longitudinal direction nor in the lateral direction.

It has already been mentioned above that the intermediate flange according to this disclosure selects those connections from the connections provided on the robot flange of the robot wrist axis that are necessary for the corresponding type of application device, these connections then being provided on the application device-side flange face of the intermediate flange in the required connection configuration. This matching function of the intermediate flange is extremely complex as a multiplicity of lines are necessary, for example, for drive air, bearing air, shaping air, paint, return, high voltage, etc. Hitherto, it was therefore hardly practicable to accommodate the required lines in the intermediate flange without the construction length of the intermediate flange being excessively long, which led to an interfering shift in the actual position of the tool center point. To solve this problem, in some implementations, the present disclosure provides that the intermediate flange is manufactured by a generative manufacturing process (rapid prototyping). This is advantageous because complex line geometries can be realized with such a generative manufacturing process so that the intermediate flange can be realized with a relatively short construction length, which in turn enables the actual position of the tool center point through the intermediate flange not to deviate substantially from the specified position stored in the robot control. Such generative manufacturing processes are known per se and are described, for example, in WO 2010/028864 A2, the contents of which are hereby incorporated by reference in this disclosure in their entirety.

The use of a generative manufacturing process also enables a tubeless intermediate flange, which in turn enables correspondingly complex line geometries and line systems within the intermediate flange. The intermediate flange according to this disclosure is therefore, in some implementations, tubeless, i.e. there are no separate flexible hoses in the intermediate flange to convey the various media (e.g. drive air, compensating air, bearing air, shaping air, coating agent, flushing agent, etc.).

In some implementations of the disclosure, at least an end-to-end light guide channel also runs through the intermediate flange to feed a light guide through to the rotary atomizer. Such a light guide can, for example, be used for revolution counting, which is known per se from the prior art and does not therefore have to be described in more detail.

In some implementations of the disclosure, the intermediate flange has a base body and the light guide channel has a cladding, said cladding of the light guide channel consisting if desired of a different material than the base body, particularly made of plastic or metal.

The light guide can therefore be assembled in the intermediate flange, for example, by screwing, clamping, clipping, gluing or similar.

In addition, such light guides are traditionally curved in a very complex way and are partly wound round the fluid lines so that the light guides are also curved in the circumferential direction. However, the intermediate flange according to this disclosure enables a substantially straighter guiding of the light guide, said light guide not having to be curved in the circumferential direction.

In addition, the intermediate flange according to this disclosure permits a substantially shorter guide length of the light guide between the robot-side connection and the application device-side connection of the light guide. For example, the actual light guide length can be less than 300%, 200%, 150% or, in some implementations, 120% of the direct connection distance without curves.

According to the principles of the present disclosure, the robot flange and the cladding of the light guide channel can also be manufactured by means of a generative manufacturing process.

Moreover, in some implementations, each of the connection configuration of the application device flange and the connection configuration of the robot flange has a multiplicity of connections. The following connections should be mentioned here by way of example:

at least one compressed air connection, particularly for drive air and shaping air and control air for the application device;

at least one coating agent connection for feeding through a coating agent;

at least one first flushing agent connection for feeding through a flushing agent to the application device;

at least one second flushing agent connection for withdrawing flushing agent from the application device;

at least one electric connection to establish electric contact with the application device, for example, for electrostatic charging of the coating agent.

at least one light guide connection to connect a light guide, for example for rev counting on a rotary atomizer.

The connection configuration of the robot flange is generally characterized as having more connections than the connection configuration of the application device flange in order optionally to be able to connect application devices with more and/or other connections. The connection configuration of the robot flange is therefore generally equipped for all desired variations so that the desired types of application devices with correspondingly differing connection configurations may be connected via the intermediate flange.

Moreover, it should be mentioned that the construction length of the intermediate flange is, in some implementations, less than 24 cm, 15 cm, 10 cm or, in some such implementations, 5 cm. This is substantially shorter than for the conventional intermediate flanges described at the start, which are not manufactured by a generative manufacturing process, thus leading to a correspondingly large construction length of the intermediate flange. This relatively large construction length of the intermediate flange has in turn the disadvantage that the actual position of the tool center point was offset by the intermediate flange. In contrast, the intermediate flange according to this disclosure does not have this disadvantage due to its short construction length, the short construction length being possible, for example, by using a generative manufacturing process.

In addition, this disclosure also provides a corresponding assembly method in which application device and intermediate flange are each matched pair-wise to each other and are replaced together. The intermediate flange has two functions in this arrangement.

Firstly, the intermediate flange selects from the connections provided on the robot side those connections which are actually required for the corresponding type of application device and makes these connections available in the design-determined connection configuration on its application device-side connection flange.

Secondly, the intermediate flange, with its construction length individually matched to the corresponding type of application device also ensures that a changeover to another type of an application device does not lead to the actual position of tool center point being shifted.

DRAWINGS

Details of this disclosure are illustrated in the following drawings, in which.

DESCRIPTION

FIGS. 1A-1D, 2A-2D and 3A-3D show a robot wrist axis 5, on which said robot wrist axis 5 various types of application devices are assembled, for each of which an intermediate flange 4 is provided. These robot assemblies partially correspond to the robot assembly already described at the beginning and presented in FIGS. 8A-8D so that, to avoid repetitions, reference is made to the preceding description, with the same reference numbers being used for the corresponding details.

Figure 1A:
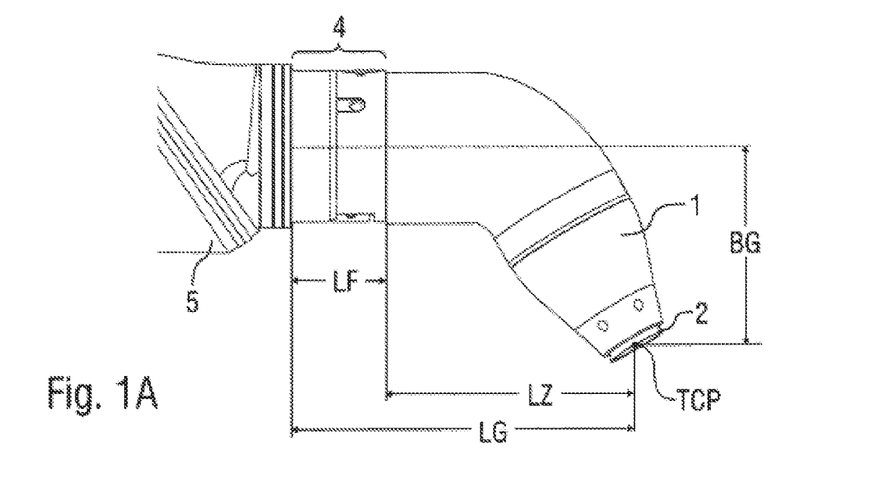
FIG. 1A shows a robot assembly according to the present disclosure with a robot wrist axis, an intermediate flange and a rotary atomizer.
Figure 1B:
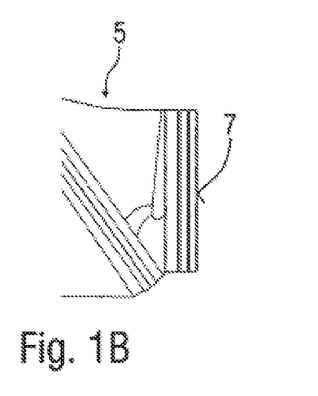
FIG. 1B shows only the robot wrist axis from FIG. 1A.
Figure 1C:
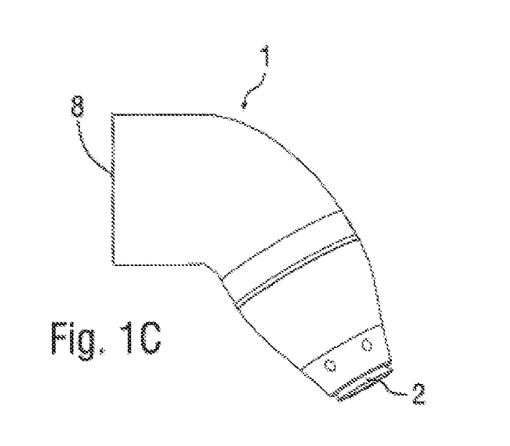
FIG. 1C shows only the rotary atomizer from FIG. 1A.
Figure 1D:
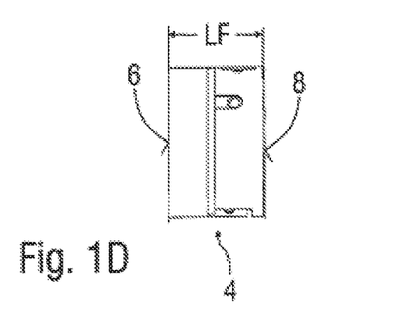
FIG. 1D shows only the intermediate flange from FIG. 1A.
Figure 2A:
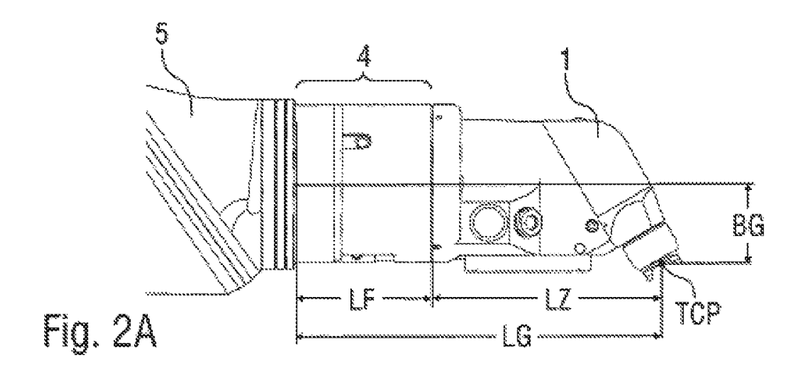
FIG. 2A shows the robot assembly from FIG. 1A with a different intermediate flange and a different atomizer.
Figure 2B:
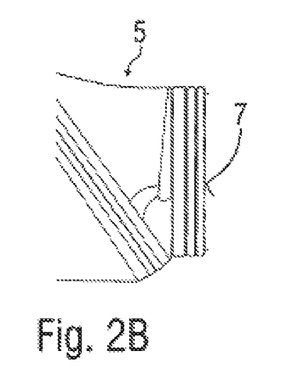
FIG. 2B shows only the robot wrist axis from FIG. 2A.
Figure 2C:
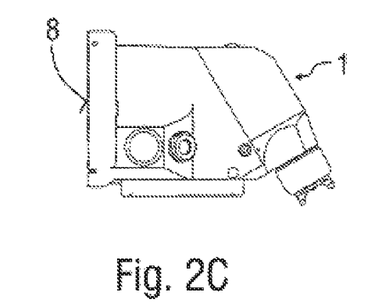
FIG. 2C shows only the atomizer from FIG. 2A.
Figure 2D:
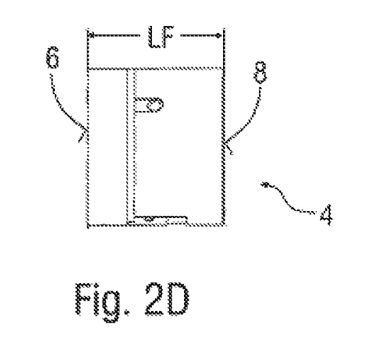
FIG. 2D shows only the intermediate flange from FIG. 2A.
Figure 3A:
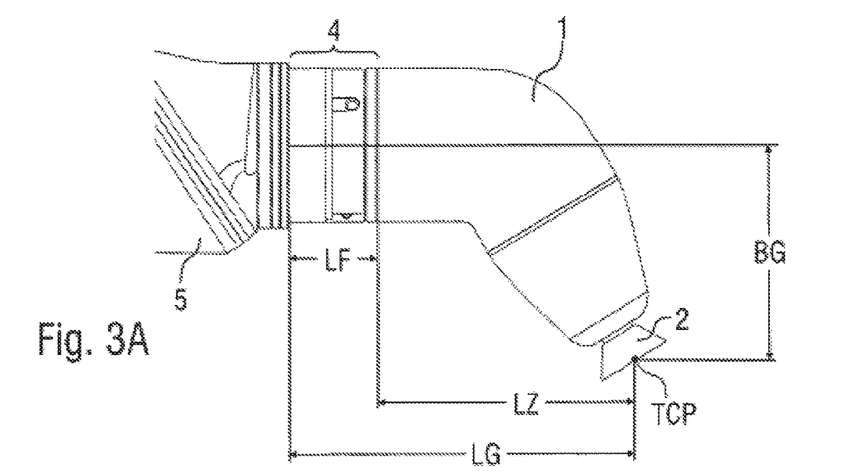
FIG. 3A shows the robot assembly from FIG. 1A with a different intermediate flange and a different rotary atomizer.
Figure 3B:
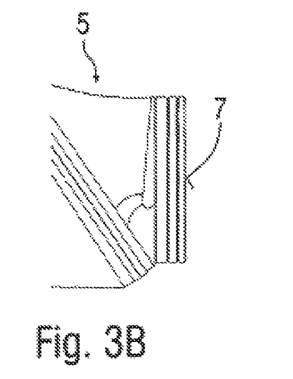
FIG. 3B shows only the robot wrist axis from FIG. 3A.
Figure 3C:
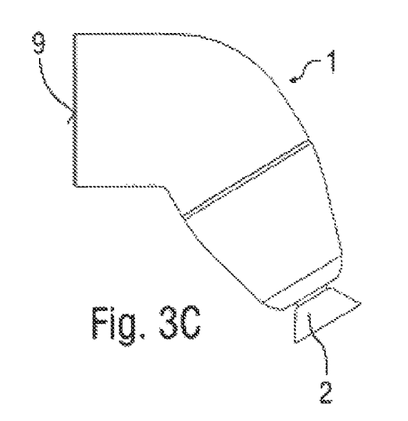
FIG. 3C shows only the rotary atomizer from FIG. 3A.
Figure 3D:
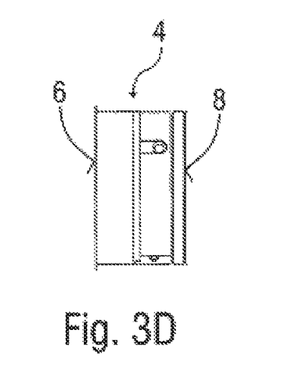
FIG. 3D shows only the intermediate flange from FIG. 3A.

In the robot assembly according to FIG. 1A, the atomizer 1 is a rotary atomizer without external electrostatic charge. In the robot assembly according to FIG. 2A, the atomizer 1 is an air atomizer. Finally, FIG. 3A shows a robot assembly with a further type of atomizer 1 assembled on the robot wrist axis 5.

In such arrangements, it is important that the robot flange 7 provides all connections on the robot wrist axis 5, which are necessary for the different types of atomizer 1. As a result, for example, in a connection of the air atomizer according to FIG. 2A, the connections for shaping air remain unused on the robot flange 7 because the shaping air is provided for other types of the atomizer 1. The intermediate flange 4 then selects from the connections provided on the robot side of the robot flange 7 those connections which are necessary for the corresponding type of atomizer 1. These connections are then provided on the atomizer-side flange face 8 of the intermediate flange 4 in that connection configuration which is necessary for the corresponding type of atomizer 1. The intermediate flange 4 thus forms an adapter for matching the connection configuration required on the atomizer side.

Moreover, the intermediate flange 4 also compensates for the differing construction lengths LZ of the various types of atomizers 1 so that replacing the atomizer 1 with another type of atomizer 1 does not lead to a shift in the actual position of the tool center point TCP. Thus, the construction length LF of the intermediate flange 4 is matched pair-wise each time to the construction length LZ of the atomizer so that the overall construction length LG between the robot flange 7 and the tool center point corresponds to that construction length which is stored in the central robot control. This has the advantage that a changeover of the atomizer 1 does not lead to an offset in the actual position of the tool center point so that the tool center point TCP in operation travels along the track that was programmed in advance.

Figure 4:
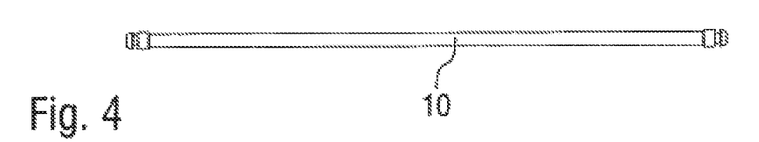
FIG. 4 shows a light guide which runs through the intermediate flange.
Figure 5:
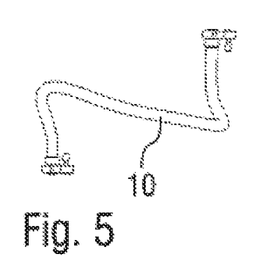
FIG. 5 shows the light guide from FIG. 4 in a curved state.
Figure 6:
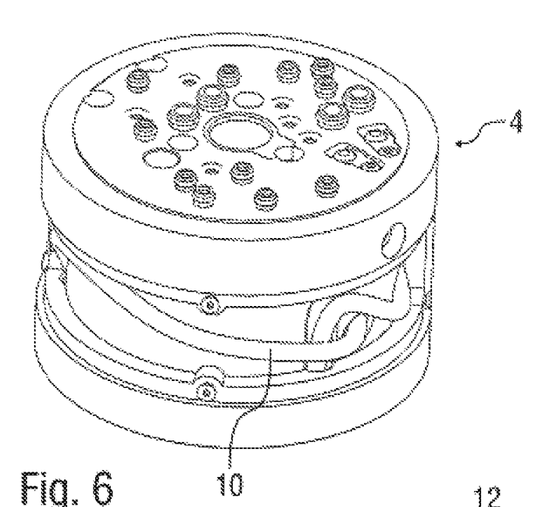
FIG. 6 shows an exemplary intermediate flange with a light guide assembled therein, FIG. shows a cross-section view through an intermediate flange according to the present disclosure with a light guide channel and a light guide assembled therein.

FIGS. 4, 5 and 6 show a modification of an intermediate flange 4 with a light guide 10, which is partially wrapped around the intermediate flange 4 in a circumferential direction, as is visible in FIG. 6.

Figure 7:
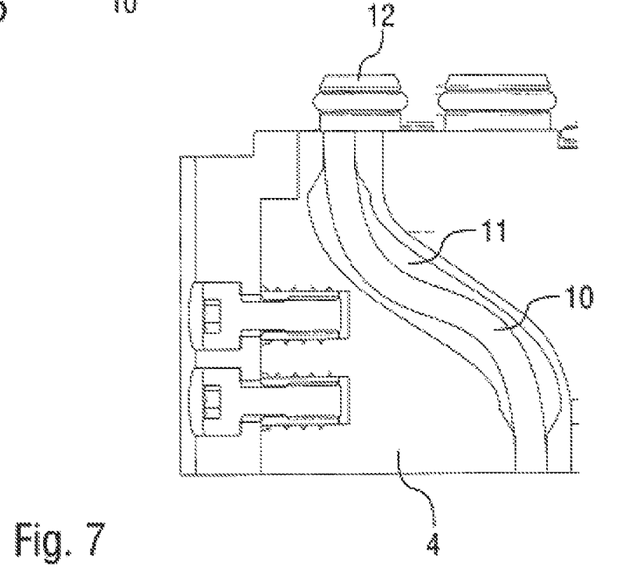
Figure 8A:
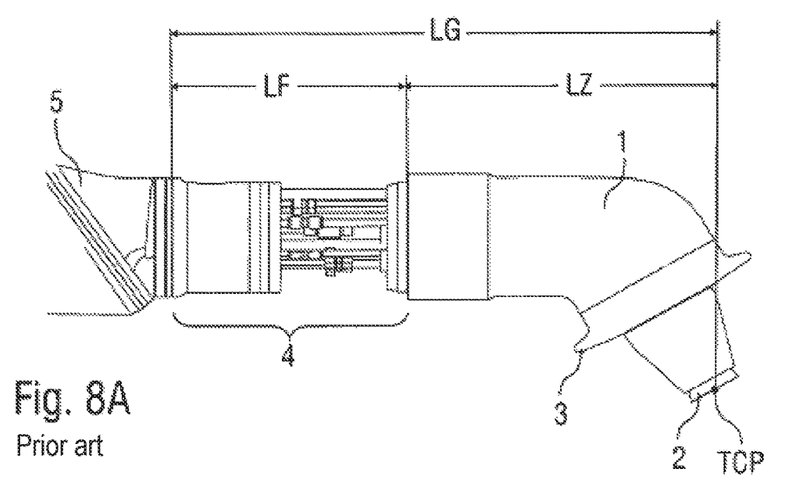
FIGS. 8A-8D show a robot assembly according to the prior art.
Figure 8B:
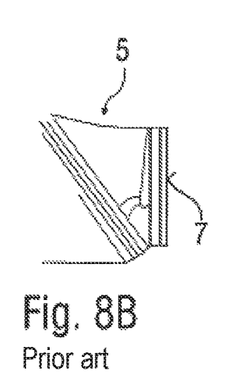
Figure 8C:
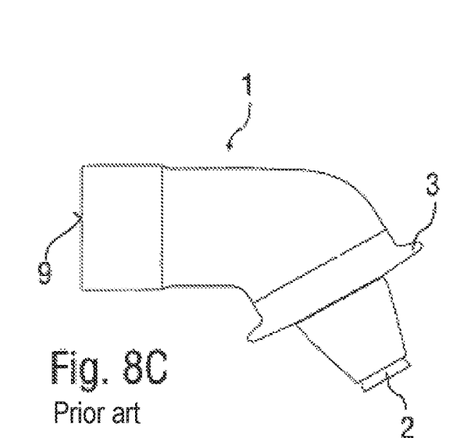
Figure 8D:
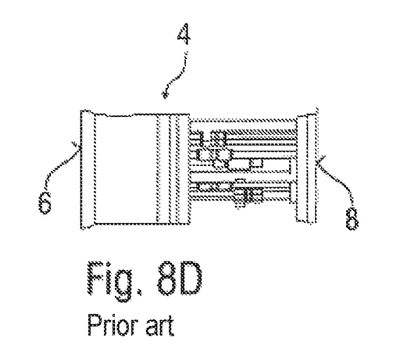

FIG. 7 shows another construction of the intermediate flange 4, which is manufactured here by means of a generative manufacturing process and which has a light guide channel 11 in which the light guide 10 is fed. This permits a substantially shorter light guide length between the light connections 12, as the light guide 10 does not have to be curved in the circumferential direction, as illustrated in FIG. 6.

The disclosure is not restricted to the implementations described above. Rather, a plurality of alternatives and modifications are possible, which also make use of the inventive concepts and thus fall within the scope.

The invention claimed is:

1. A robot assembly comprising:
an application robot with a robot flange, the robot flange having a robot connection configuration, the application robot defining a tool center point, the application robot having a robot length from the robot flange to the tool center point;

a robot controller operably coupled to the application robot, the robot controller storing the robot length;

a first application device including a first applicator flange with a first applicator connection configuration, the application device having a first applicator length; and a first intermediate flange with a first intermediate length, the first intermediate flange configured to couple the robot flange and the first applicator flange, the first intermediate flange configured to couple corresponding portions of the first applicator connection configuration and the robot connection configuration, respectively, wherein a sum of the first intermediate length and the first applicator length is substantially equal to the robot length;

a second application device including a second applicator flange with a second applicator connection configuration, the second application device having a second applicator length; and a second intermediate flange with a second intermediate length, the second intermediate flange configured to couple the robot flange and the second applicator flange, the second intermediate flange configured to couple corresponding portions of the second applicator connection configuration and the robot connection configuration, respectively, wherein a sum of the second intermediate length and the second applicator length is substantially equal to the robot length, and wherein the first applicator length is different than the second applicator length.

2. The robot assembly according to claim 1, wherein the first intermediate flange is configured to couple the first application device to the robot flange with a first lateral offset to laterally align the first application device with the tool center point.

3. The robot assembly according to claim 1, wherein the first intermediate flange has at least an end-to-end light guide channel configured to receive a light guide fed therethrough.

4. The robot assembly according to claim 3, wherein the first intermediate flange has a base body and the light guide channel has a cladding, the cladding of the light guide channel having a different material than the base body.

5. The robot assembly according to claim 3, wherein the light guide is fastened into the first intermediate flange.

6. The robot assembly according to claim 3, wherein the light guide has an overall light guide length, and the assembly defines an installed light guide distance between a robot-side connection of the light guide and an application device-side connection of the light guide, the light guide length being less than 300% of the installed light guide distance.

7. The robot assembly according to claim 4, wherein at least one of the intermediate flange, the robot flange and the cladding of the light guide channel is at least partially manufactured by a generative manufacturing process.

8. The robot assembly according to claim 1, wherein each of the robot connection configuration and the first applicator connection configuration includes:
at least one compressed air connection,
at least one coating agent connection for feeding through a coating agent,
at least one first flushing agent connection for feeding through a flushing agent to the first application device,
at least one second flushing agent connection for withdrawing flushing agent from the first application device,
at least one electric connection, and
at least one light guide connection to connect a light guide.

9. The robot assembly according to claim 1, wherein the robot connection configuration has more connections than the first applicator connection configuration.

10. The robot assembly according to claim 1, wherein the first intermediate length is less than 24 cm.

11. The robot assembly according to claim 1, wherein the second applicator connection configuration is different than the first applicator connection configuration.

12. A method for assembling application devices to an application robot comprising:
coupling a first intermediate flange to a robot flange of the application robot, the first intermediate flange having a first intermediate length;
coupling a first application device to the first intermediate flange, the first application device having a first applicator length defined between a first applicator flange and a tool center point of the application robot,
storing in a robot control a robot length between the robot flange and the tool center point,
wherein a sum of the first intermediate length and the first applicator length is equal to the robot length
removing the first application device and the first intermediate flange from the application robot; and
coupling a second intermediate flange to the robot flange, the second intermediate flange having a second intermediate length; and
coupling a second application device to the second intermediate flange, the second application device having a second applicator length defined between a second applicator flange and the tool center point of the application robot;
wherein a sum of the second intermediate length and the second applicator length is equal to the robot length.

13. The method according to claim 12, wherein the first intermediate flange couples the first application device to the robot flange with a first lateral offset to laterally align the first application device with the tool center point.

* * * * *